United States Patent
Serizawa (10) Patent No.: US 6,438,289 B1
(45) Date of Patent: Aug. 20, 2002

(54) LIGHT EMITTING AND RECEIVING DEVICE

(75) Inventor: Naoshi Serizawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/552,499

(22) Filed: Apr. 19, 2000

(30) Foreign Application Priority Data

Apr. 21, 1999 (JP) .......................................... 11-113804

(51) Int. Cl.⁷ ................................................ G02B 6/26
(52) U.S. Cl. ............................ 385/31; 385/34; 385/40; 385/49; 385/74; 385/88; 385/93; 385/52; 372/92; 372/107; 372/65
(58) Field of Search .............................. 385/31, 33, 34, 385/39, 40, 49, 73, 74, 88, 92, 93, 52; 372/107, 65, 98, 92, 72

(56) References Cited

U.S. PATENT DOCUMENTS

| | | |
|---|---|---|
| 5,416,624 A | 5/1995 | Karstenen |
| 5,579,426 A | 11/1996 | Li et al. |
| 6,220,764 B1 * | 4/2001 | Kato et al. .................... 385/88 |

FOREIGN PATENT DOCUMENTS

| | | |
|---|---|---|
| GB | 2 203 853 A | 10/1988 |
| JP | 61-9610 | 1/1986 |

* cited by examiner

Primary Examiner—Cassandra Spyrou
Assistant Examiner—Fayez Assaf
(74) Attorney, Agent, or Firm—Armstrong, Westerman & Hattori, LLP (57) ABSTRACT

A light emitting and receiving device consists of a light propagating member provided with a light emitting means for converting first electrical signals into first optical signals, and a light receiving means for receiving and converting second optical signals into second electrical signals. The light receiving means is disposed coaxially with an optical fiber. The light propagating member is situated between the optical fiber and the light receiving means. The light emitting means emits the first optical signals into the optical fiber, and the light propagating member receives from the optical fiber and propagates therethrough the second optical signals to the light receiving means. Loss of optical power is suppressed, and a downsized light emitting and receiving device is attained.

7 Claims, 5 Drawing Sheets

LIGHT EMITTING AND RECEIVING DEVICE

BACKGROUND OF THE INVENTION

1. Field of the Invention

This invention relates to a light emitting and receiving device for bidirectional optical communications with one optical fiber.

2. Description of the Related Art

Figure 5:
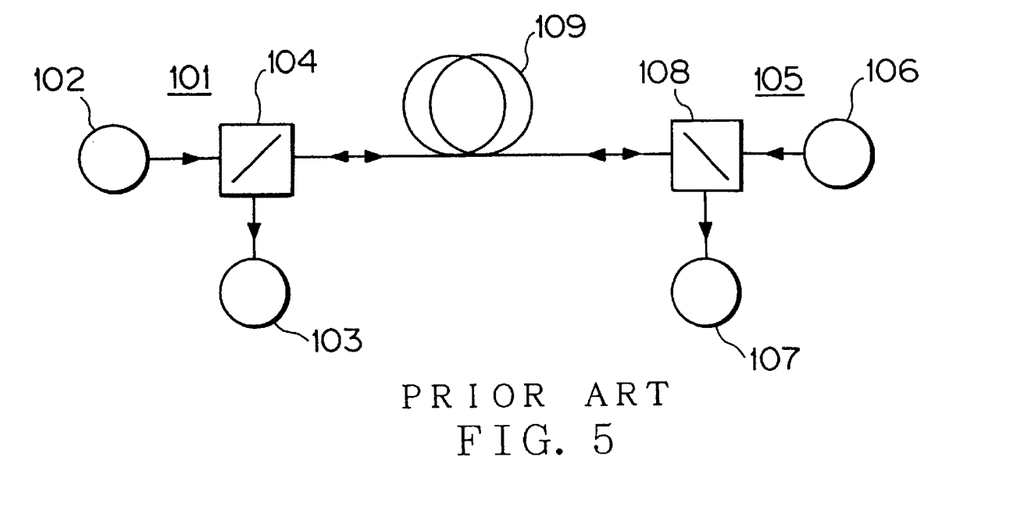
FIG. 5 is a basic block diagram of a conventional optical bidirectional communications system.

FIG. 5 is a basic block diagram of an optical bidirectional communications system proposed in Japanese Patent Application Unexamined Publication No. 61-9610. Below is description of the system construction.

Denoted 101 is a light emitting and receiving device which consists of a light emitter 102 for converting electrical signals to optical signals, a light receiver 103 for converting optical signals to electrical signals, and an optical branching filter 104. Denoted 105 is also a light emitting and receiving device which consists of a light emitter 106, a light receiver 107 and an optical branching filter 108, all having the same constructions as those in the light emitting and receiving device 101. The light emitting and receiving devices 101 and 105 are optically connected to each other via one optical fiber 109.

Figure 6:
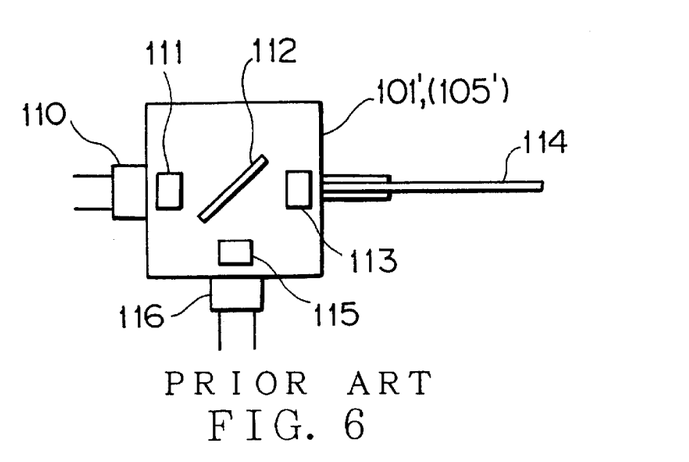
FIG. 6 is a schematic diagram of a conventional light emitting and receiving device with components as shown in FIG. 5, provided in one piece structure.

The publication as mentioned above also discloses a light emitting and receiving device 101', 105' which is of one-piece structure as shown in FIG. 6. In this structure, light from a light emitting element 110 is converted into parallel lights at a lens 111, gathered via a half mirror 112 at a lens 113, and passed to an optical fiber 114. On the other hand, light from the optical fiber 114 is reflected at the half mirror 112, gathered at a lens 115, and passed to a light receiving element 116.

Figure 7:
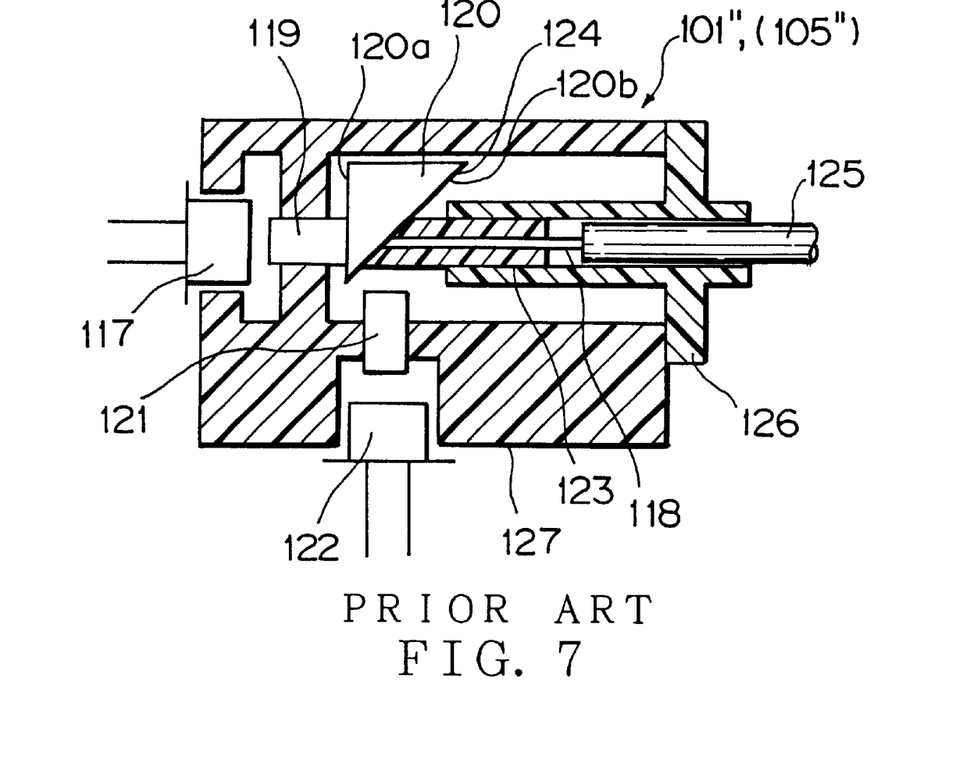
FIG. 7 is a section of another example of a conventional light emitting and receiving device with components as shown in FIG. 5, provided in one piece structure.

The publication as mentioned above further discloses a light emitting and receiving device 101", 105" as shown in FIG. 7, which consists of a light emitting element 117, an optical fiber 118, a first lens 119, a glass block 120, a second lens 121 and a light receiving element 122.

The optical fiber 118 has its front end portion received at a center axis in a glass tube 123 and has its front end surface obliquely ground at an angle of about 45° with the glass tube 123.

The first lens 119 is disposed between the light emitting element 117 and the optical fiber 118 and gathers light from the light emitting element 117 to pass to the optical fiber 118.

The glass block 120 has a surface 120a in opposition to an end surface of the first lens 119, which is ground at right angles to the center axis of the optical fiber 118, and a surface 120b ground at an angle of about 45° relative to the center axis of the optical fiber 118 and coated with a half mirror 124.

The second lens 121 gathers light from the optical fiber 118 which is reflected at the half mirror 124.

A holder 126, which has the glass tube 123 and an outer sheath 125 of the optical fiber 118 fixed in its hollow interior, the light emitting element 117, the first and second lenses 119 and 121, the light receiving element 122 and the glass block 120 are received in a housing 127.

Figure 8:
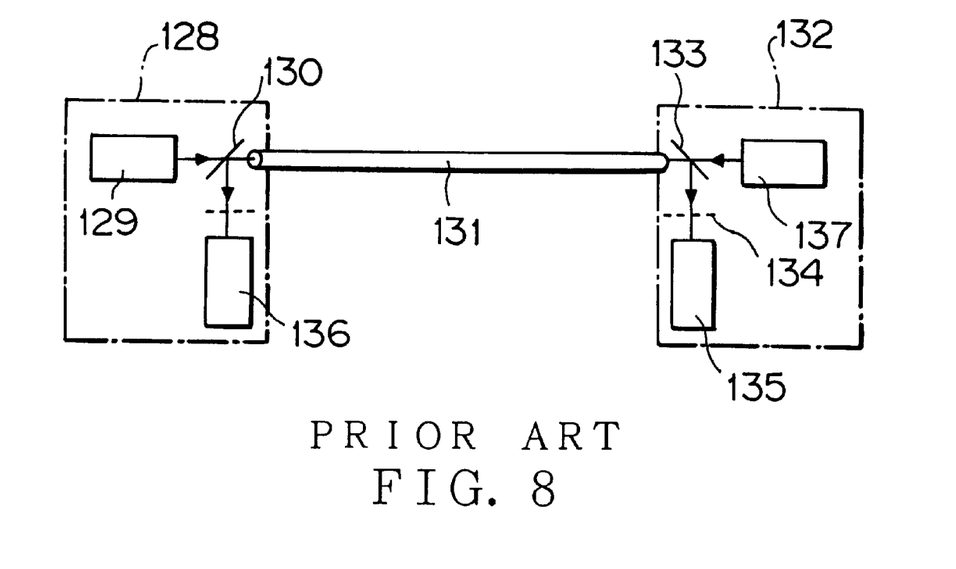
FIG. 8 is a basic block diagram of another example of a conventional optical bidirectional communications system.

Another system is also proposed in Japanese Patent Application Unexamined Publication No. 63-175539, which is as shown in FIG. 8.

In this system, as shown in FIG. 8, light emitted from a light emitting means 129 of a light emitting and receiving device 128 passes through a half mirror 130, enter and travel through an optical fiber 131, is reflected at a half mirror 133 of a light emitting and receiving device 132, and pass through a diffraction grating 134 into a light receiving means 135.

Description of the operation in the opposite direction will be omitted. Denoted 136 is a light receiving means and 137 is a light emitting means.

With the above systems, however, because each light emitting and receiving device is provided with a half mirror as an indispensable component, loss of optical power has been inevitable. In other words, if light passes through a half mirror in optical communications, its amount becomes one half the amount before passing through (reflection at) the half mirror, resulting in the loss mentioned above.

Further, because of the structure in which the light receiving means receives light after it is reflected at the half mirror, it is necessary that the receiving means is situated at a position perpendicular to the axis of the optical fiber, the light emitting and receiving device becomes unfavorably upsized.

SUMMARY OF THE INVENTION

This invention has been accomplished to overcome the above drawbacks and an object of this invention is to provide a light emitting and receiving device which reduces loss of optical power, and which is downsized.

In order to attain the object, according to this invention, there is provided a light emitting and receiving device which comprises: an optical fiber; a light propagating member capable of propagating light therethrough, which is provided with a light emitting means, the light emitting means converting first electrical signals into first optical signals; and a light receiving means which receives second optical signals and converts the second optical signals into second electrical signals, the light receiving means being disposed coaxially with the optical fiber, wherein the light propagating member is situated between an end of the optical fiber and the light receiving means, such that the light emitting means emits the first optical signals into the optical fiber at the end, and that the light propagating member receives from the optical fiber and propagates therethrough the second optical signals to the light receiving means.

In the above light emitting and receiving device, due to the arrangement in which the light propagating member with the light emitting means is situated between an end of the optical fiber and the light receiving means, the light having traveled through the optical fiber passes through the light propagating member to the light receiving means, and the light emitted from the light emitting means passes through the light propagating member or directly into the optical fiber.

Without a half mirror which has conventionally been used as an indispensable component, in the present device, for example the light from the optical fiber is prevented from being reduced by half, thereby to realize a better optical communication.

Further, due to the arrangement in which the light receiving means is disposed coaxially with the optical fiber and the light emitting means is provided on the light propagating member between the light receiving means and the optical fiber, a more compact light emitting and receiving device than the conventional one is attained. In other words, because no half mirror is employed which reflects light, no main component needs to be located at a position in a direction of reflection of light from the half mirror or direction perpendicular to the axis of the optical fiber, a compact light emitting and receiving device is attained.

Thus, loss of optical power is suppressed, while attaining a downsized light emitting and receiving device.

Incidentally, during propagation of light through the light propagating member to the light receiving means, part of the light may be obstructed by the light emitting means. This, however, can be coped with by reducing the surface area of the light emitting means facing the optical fiber. The loss can be minimized in this way and will cause no problem.

Preferably, the light propagating member has a cavity formed therein for mounting the light emitting means in an integrated manner with the light propagating member.

In this way, the light emitting means may be prepared in advance, in a separate process, in conformity to the shape of the cavity and combined integrally with the light propagating member by mounting same in the cavity.

Preferably, the cavity is formed at such position as to open to an end surface of the light propagating member opposed to the end of the optical fiber.

This arrangement allows the light from the light emitting means to directly enter the optical fiber, while reducing the number of boundary surfaces between the light emitting means and the light propagating member.

Preferably, the light emitting means, when mounted in the cavity, has an end surface thereof flush with the end surface of the light propagating member.

Advantageously, the light propagating member has a step portion formed at an end thereof opposed to the end of the optical fiber for mounting the light emitting means in an integrated manner with the light propagating member, the step portion extending in a width direction across the light propagating member.

This arrangement allows the light emitting means to be prepared in advance, in a separate process, in conformity to the shape of the step portion and to be combined integrally with the light propagating member by mounting same in the cavity. This arrangement also allows the light from the light emitting means to directly enter the optical fiber, while reducing the number of boundary surfaces between the light emitting means and the light propagating member. The step portion is easily formable in the light propagating member.

Preferably, the light emitting means comprises a light propagating portion having the same refractive index as that of the light propagating member.

According to this invention, there is further provided an optical connector including a receptacle and an optical plug, the receptacle having a housing and a light emitting and receiving device received in the housing, the optical plug having a plug housing and an optical fiber received in the plug housing to be urged to the light emitting and receiving device when the receptacle and the optical plug are fitted together, the light emitting and receiving device comprising: a light propagating member capable of propagating light therethrough, which is provided with a light emitting means, the light emitting means converting first electrical signals into first optical signals; and a light receiving means which receives second optical signals and converts the second optical signals into second electrical signals, the light receiving means being disposed coaxially with the optical fiber, wherein the light propagating member is situated between an end of the optical fiber and the light receiving means, such that the light emitting means emits the first optical signals into the optical fiber at the end, and that the light propagating member receives from the optical fiber and propagates therethrough the second optical signals to the light receiving means.

The above and other objects, features and advantages of this invention will become apparent from the following description and the appended claims, taken in conjunction with the accompanying drawings.

DESCRIPTION OF THE PREFERRED EMBODIMENTS

Embodiments of this invention will now be described with reference to the attached drawings.

Figure 1:
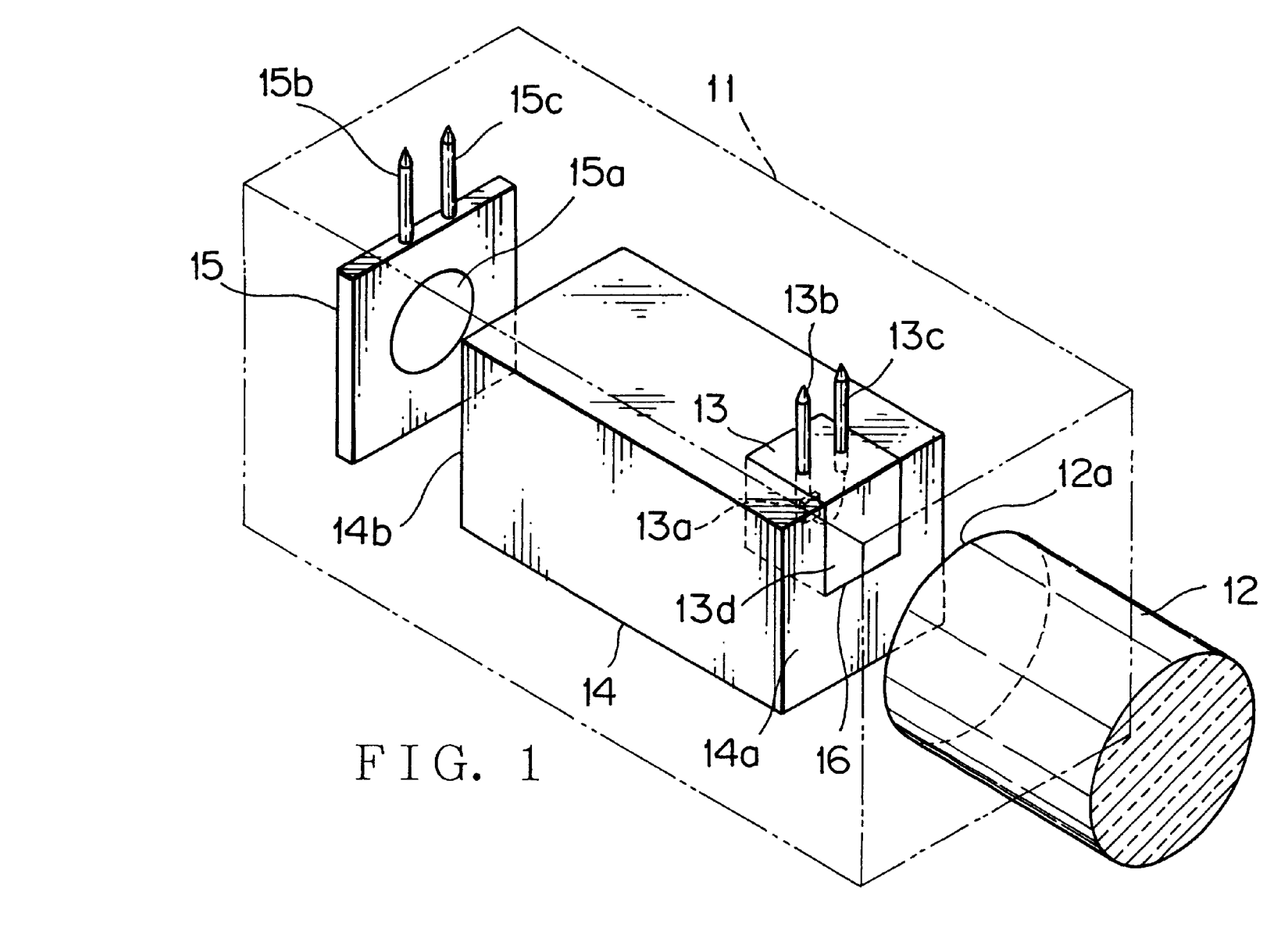
FIG. 1 is a schematic diagram of a light emitting and receiving device according to one embodiment of this invention.

In FIG. 1, denoted 11 is a light emitting and receiving device for optical bidirectional communications in, for example, a vehicle. The light emitting and receiving device 11 includes a known optical fiber 12 having a core and a cladding, a light propagating member 14 disposed coaxially with the optical fiber 12 and provided at its front end with a light emitting means in the form of a light emitting diode 13, and a light receiving means in the form of a photodiode 15 disposed coaxially with the optical fiber 12 and opposed to a rear end surface 14b of the light propagating member 14.

Figure 2:
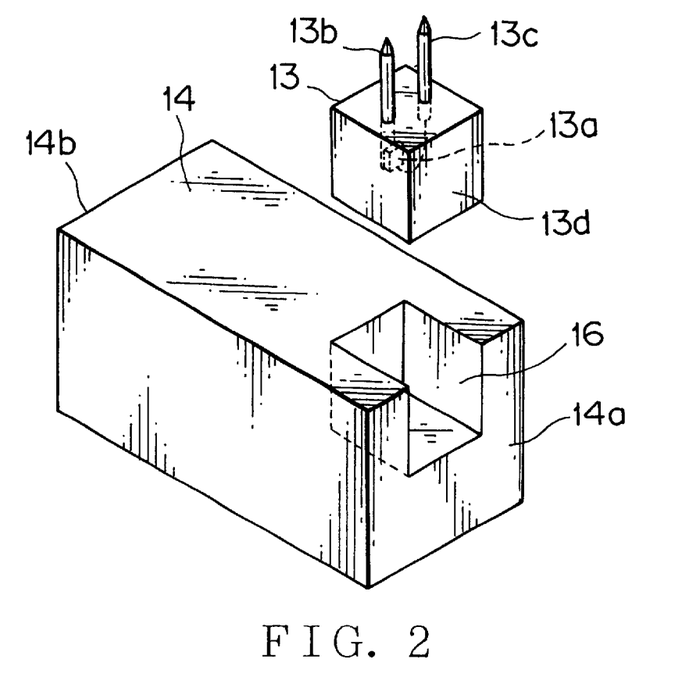
FIG. 2 is a perspective view of a light propagating member as in FIG. 1, with a light emitting diode shown separated.

The light propagating member 14 is made of transparent glass or synthetic resin material suited for optical communications and has a rectangular parallelepiped shape as shown in FIG. 2. (The shape is not limited d to such, for example, a cylindrical column of the same diameter as the optical fiber 12 may also be employed. The light propagating member 14 consists of a core and a cladding (not shown) which respectively have the same refractive indexes as the core and the cladding of the optical fiber 12.

The light propagating member 14 has a front end surface 14a parallel to an end surface 12a (FIG. 1) of the optical fiber 12, and a cavity 16 opening to the front end surface 14a which is for mounting the light emitting diode 13 such that the light from the light emitting diode 13 directly enters the optical fiber 12.

The cavity 16, in the present embodiment, is formed on an upper surface (FIG. 2) of the light propagating member 14 at a center in a width direction thereof, with a depth almost reaching the center axis of the light propagating member 14. The cavity 16 is of such shape as to be easily formed in the light propagating member 14, no matter whether the latter is made of glass or synthetic resin.

Incidentally, it is also possible that the light propagating member 14 is entirely made of glass or synthetic resin having the same refractive index as the core of the optical fiber 12 and coated circumferentially, i.e., on its four major walls with material having the same refractive index as the cladding material of the optical fiber 12.

It is also possible to form the cavity 16 with a larger depth so as to position a later-described light emitting portion 13a of the light emitting diode 13 at the center axis, and that the cavity 16 is formed at a center in a length direction of the optical fiber 14. Further, the end surface 12a of the optical fiber 12 may be coated with anti-reflection material.

The light emitting diode 13 includes the light emitting portion 13a having a light emitting surface parallel to the front end surface 14a of the light propagating member 14, an electrode 13b implemented with the light emitting portion 13a, an electrode 13c having a wire bonded from the light emitting portion 13a, and a cubic light propagating portion 13d packaging these components, with the electrodes 13b and 13c protruding to the outside. The light propagating portion 13d has its front end surface flush with the front end surface 14a of the light propagating member 14. The light emitting diode 13 is fixed in the cavity 16 with an adhesive such as of acrylic resin or epoxy resin, having the same or approximately the same refractive index as the light propagating portion 13d and the light propagating member 14.

The light propagating portion 13d is made of the same material as and has the same refractive index as the light propagating member 14. (It is also possible that the light propagating portion 13d employs a core and cladding structure, or is coated on the surface with the protruding electrodes 13b and 13c with material having the same refractive index as the cladding of the optical fiber 12.

The photodiode 15 is packaged with a light receiving portion 15a and a not-shown light receiving element located inwardly of the light receiving portion 15a, in the same manner as the light propagating portion 13d. Denoted 15b and 15c are electrodes connecting to the above light receiving element.

Although in the present embodiment there are employed, as the light emitting means and the light receiving means, the diode 13 and the photodiode 15, the light emitting means and the light receiving means are not limited to these insofar as capable of converting electrical signals to optical signals and converting optical signals to electrical signals.

The operation of the light emitting and receiving device 11 of the above construction will now be described.

The light having propagated through the optical fiber 12 leaves same at the end surface 12a and enter the light propagating member 14 at the front end surface 14a. The light then travels to the rear end surface 14b, while repeatedly subjected to total reflections inside the light propagating member 14, and leaves the light propagating member at the rear end surface 14b to enter the not-shown light receiving element through the light receiving portion 15a of the photodiode 15. It is to be noted that, although the light emitting portion 13a and the electrodes 13b and 13c, which are located in the light propagating member 14, may obstruct part of the light during its propagation through the light propagating member 14, such will be negligible, for they obstruct the light by a very small extent of area.

On the other hand, the light emitted from the light emitting portion 13a of the light emitting diode 13 passes through the light propagating portion 13d and enters the optical fiber 12 at the end surface 12a to propagate to a not-shown mating light emitting and receiving device.

As described above with reference to FIGS. 1 and 2, because the light propagating member 14, which is provided with the light emitting diode 13 as the light emitting means and which is capable of propagating light to the photodiode 15 as the light receiving means, is disposed between the end surface 12a of the optical fiber 12 and the photodiode 15 disposed coaxially with the optical fiber 12, the light from the optical fiber 12 passes through the light propagating member 14 to enter the photodiode 15, and the light from the light emitting diode 13 provided in the light propagating member 14 directly enters the optical fiber 12, with the result that there is almost no loss of optical power. Further, because of the arrangement in which no main components are disposed at a position perpendicular to the axis of the optical fiber 12, the light emitting and receiving device 11 is downsized as compared with the conventional devices.

Thus, a light emitting and receiving device may be obtained which reduces loss of optical power, and which is downsized.

A variant of the light propagating member 14 as shown in FIG. 2 will now be described with reference to FIG. 3.

Figure 3:
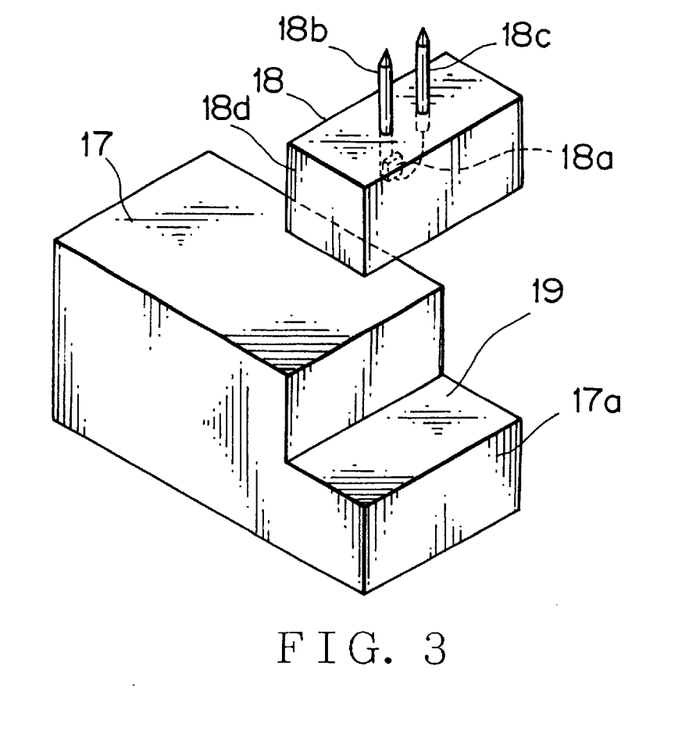
FIG. 3 is a perspective view of a variant of the light propagating member of FIG. 2.

In FIG. 3, a light propagating member 17 is made of the same material for the light propagating member 14 (FIG. 1) to have the same refractive index. The light propagating member 17 is formed at its front end with a step portion 19 which extends in a width direction across the light propagating member, and which mounts and fixes thereon the light emitting means in the form of a light emitting diode 18.

The light emitting diode 18 includes a light emitting portion 18a having a light emitting surface flush with the front end surface 17a of a light propagating member 17, an electrode 18b implemented with the light emitting portion 18a, an electrode 18c having a wire bonded from the light emitting portion 18a, and a cubic light propagating portion 18d packaging these components, with the electrodes 18b and 18c protruding to the outside. The light emitting diode 18 is the same as the light emitting diode 13 except for the shape of its light propagating portion 18d.

The same operation and effect as mentioned above can be obtained with the light propagating member 17 of the above construction.

A concrete example of an optical connector incorporating a light emitting and receiving device of this invention will now be described with reference to FIG. 4.

Figure 4:
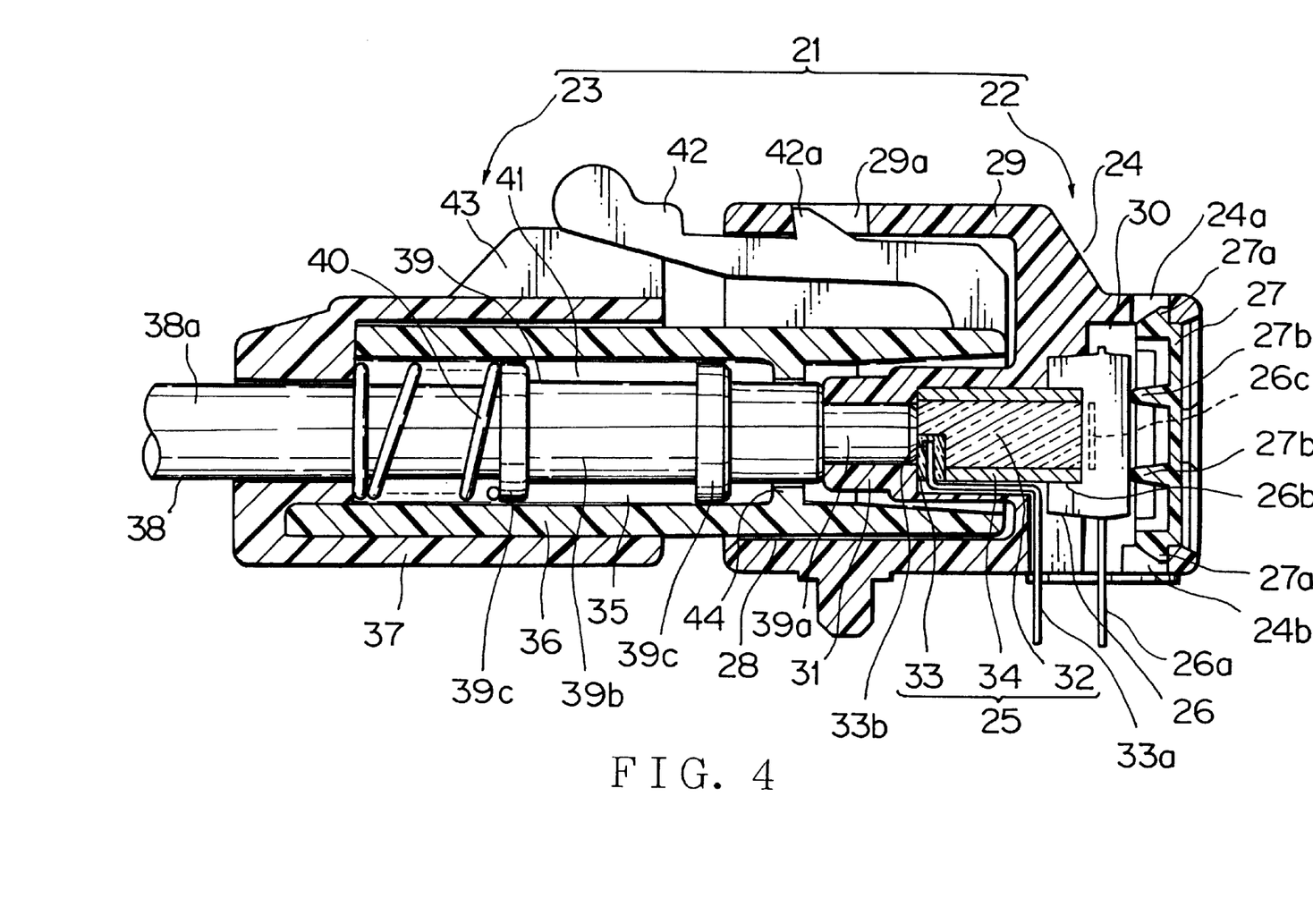
FIG. 4 is a longitudinal section of an example of an optical connector employing a light emitting and receiving device according to this invention.

In FIG. 4, denoted 21 is an optical connector with the light emitting and receiving device, which includes a receptacle 22 and an optical plug 23.

The receptacle 22 has a rectangular connector housing 24 which opens forwardly and rearwardly, and the optical plug 23 is fittable in a fitting portion 28 at the front open end of the connector housing 24. In the rear open end of the connector housing 24 are fitted in sequence a sleeve 25, a light receiving means in the form of a receive module 26, and a cap 27. On its upper wall toward the front end, the connector housing 24 has a locking portion 29 for locking engagement with a later-described locking arm 42 of the optical plug 23.

The locking portion 29 is elevated from the upper wall of the connector housing 24 to have a U-shaped cross section and provided with a rectangular locking hole 29a for engagement therein of a locking projection 42a of the locking arm 42.

The connector housing 24 is internally formed at the rear end with an accommodating chamber 30 for the receive module 26, and openings 24a, 24b are formed in the respective upper and lower walls of the connector housing 24 which communicate to the accommodating chamber 30. Locking projections 27a, 27a provided at upper and lower edges of the cap 27 lockingly engage in the openings 24a, 24b, and an electrode 26a of the receive module 26 and an electrode 33a of a later-described light emitting diode 33 extend outside through the opening 24b.

Further, the connector housing 24 is internally provided at an intermediate length thereof with a cylindrical receiver 31 which extends from the fitting portion 28 to the accommodating chamber 30. The cylindrical receiver 31 extends longitudinally to project at its front side into the fitting portion 28 and is integral with the connector housing 24. The cylindrical receiver 31 internally has a forward small-diameter and rearward large-diameter portions, with a shoulder formed therebetween, for receiving a later-described ferrule unit 35 of the optical plug 23 and the sleeve 25, respectively. The sleeve 25 is inserted into the large diameter portion through the accommodating chamber 30 until it abuts against the shoulder, whereby to place the sleeve 25 in position. The cylindrical receiver 31 is internally provided at its small-diameter portion with not-shown, for example, four minute projections at equal angles for holding the sleeve 25.

The sleeve 25 is of cylindrical column shape and includes a light propagating portion 32 made up of a core and a cladding, a packaged light emitting diode 33 as a light emitting means fixed in a cavity formed in the light propagating portion 32 to open to its front end surface, and a cylindrical holder 34 provided circumferentially around the light propagating portion 32 with a cutout for the light emitting diode 33. An electrode 33a extends to the outside from the light emitting diode 33. Denoted 33b is the light emitting portion of the light emitting diode 33.

The material and structure of the light propagating portion 32 and of the light emitting diode 33 are the same as those of the above-described light propagating member 14 and of the light emitting diode 13, and the holder 34 is made of metallic material. The numerical aperture of the light propagating portion 32 is greater than or equal to the numerical aperture of a later-described optical fiber 38.

The receive module 26 is provided in packaged form as the light emitting diode 33 and has a fitting recess 26b at the center or the sleeve 25. In the vicinity of the fitting recess 26b is buried a light receiving element 26c substantially of the same diameter as the light propagating portion 32.

The cap 27 is provided at its inner side with two projections 27b, 27b of rectangular section which press on the receive module 26.

On the other hand, the optical plug 23 includes the ferrule unit 35, a plug housing 36 and a spring cap 37, and the ferrule unit 35 includes the optical fiber 38, a ferrule 39 attached to the front end of the optical fiber 38 and a spring 40.

The optical fiber 38 is a known one and includes a light propagating portion (not shown) made up of a core (not shown) and a cladding (not shown) with a smaller refractive index than the core, and a first sheath (not shown) and a second sheath 38a which cover the light propagating portion. The optical fiber 38 is attached, at its front end where the first and second sheathes are peeled off, to the ferrule 39. The numerical aperture of the optical fiber 38, in the present embodiment, is 0.5, though this value is a mere example and not restrictive. Further, the optical fiber 38 in the present embodiment is a plastic optical fiber.

The ferrule 39 has a cylindrical small-diameter and large-diameter portions 39a and 39b, the former for receiving the light propagating portion (not shown) of the optical fiber 38 and the latter for receiving the first-sheath covered portion (not shown) of the optical fiber. The ferrule 39 and the optical fiber 38 are secured to each other with an adhesive or the like to prevent slipping of the optical fiber 38 from the ferrule 39.

The large diameter portion 39b is externally provided with two circumferential flanges 39c, 39c, and a spring 40 is interposed between the rearward flange 39c and the spring cap 37.

The plug housing 36 of the optical plug 23 is a rectangular box with a hollow receiving chamber 41 formed therein for receiving the ferrule unit 35 and is provided on its upper wall at the front end with a locking arm 42 having a locking projection 42a engageable in the locking hole 29a of the receptacle 22. Through depression at a rear end of the locking arm 42, the optical plug 23 is fittable into the receptacle 22.

The spring cap 37 fits over the plug housing 36 and has protector walls 43, 43 upright on its upper wall (only one is shown) for protecting therebetween the locking arm 42. The spring 40 abuts against an innermost wall of the spring cap 37. The spring cap 37 is internally provided at an intermediate length thereof with a known locking means such as a locking projection (not shown) for prevention of slipping from the plug housing 36.

The optical plug 23 is assembled by placing the ferrule unit 35 into the plug housing 36 and then fitting the spring cap 37 over the plug housing 36. The spring 40 urges the ferrule unit 35, and a stopper 44 formed internally of the receiving chamber 41 holds the ferrule unit 35 inside the receiving chamber.

With the construction as mentioned above, if the optical plug 23 fits in the receptacle 22, the cylindrical receiver 31 advances into the plug housing 36, so that the small-diameter portion 39a of the ferrule unit 35 advances into the cylindrical receiver 31, and the large-diameter portion 39b of the ferrule unit 35 abuts against the tip end of the cylindrical receiver 31 with a moderate contact pressure caused by the spring 40.

In this condition, the ferrule unit 35 and the sleeve 25 as well as the receive module 26 and the sleeve 25 are disposed end-to-end with a minimum space therebetween.

To describe the operation, the light having traveled through the optical fiber 38 leaves the optical fiber 38 at the front end to enter the light propagating portion 32 of the sleeve 25. The light then propagates, while subjected to repeated total reflections inside the light propagating portion 32, to the rear end surface of same, whereat to leave the light propagating portion 32 and enter the light receiving element 26c of the receive module 26.

On the other hand, the light emitted from the light emitting portion 33b of the light emitting diode 33 directly enters the optical fiber 38 at the end opposed thereto and propagates to a not-shown mating light emitting and receiving device.

The thus constructed optical connector 21, as described above, successively suppresses loss of optical power and is compact in size.

Having now fully described the invention, it will be apparent to one of ordinary skill in the art that many changes and modifications can be made thereto without departing from the spirit and scope of the invention as set forth herein.

What is claimed is:

1. A light emitting and receiving device comprising:

an optical fiber;

a light propagating member for propagating light therethrough, which is provided with a light emitting means located coaxially between said light propagating member and an end of said optical fiber, said light emitting means converting first electrical signals into first optical signals; and a light receiving means which receives second optical signals and converts said second optical signals into second electrical signals, said light receiving means being disposed coaxially with said optical fiber, wherein said light propagating member is situated between said end of said optical fiber and said light receiving means, such that said light emitting means emits said first optical signals into said optical fiber at said end, and that said light propagating member receives from said optical fiber and propagates therethrough said second optical signals to said light receiving means.

2. The light emitting and receiving device according to claim 1, wherein said light emitting means comprises a light propagating portion having the same refractive index as that of said light propagating member.

3. A light emitting and receiving device comprising:

an optical fiber;

a light propagating member for propagating light therethrough, which is provided with a light emitting means, said light emitting means converting first electrical signals into first optical signals; and a light receiving means which receives second optical signals and converts said second optical signals into second electrical signals, said light receiving means being disposed coaxially with said optical fiber, wherein said light propagating member is situated between an end of said optical fiber and said light receiving means, such that said light emitting means emits said first optical signals into said optical fiber at said end, and that said light propagating member receives from said optical fiber and propagates therethrough said second optical signal to said light receiving means, and wherein said light propagating member has a cavity formed therein for mounting said light emitting means in an integrated manner with said light propagating member.

4. The light emitting and receiving device according to claim 3, wherein said cavity is formed at such position as to open to an end surface of said light propagating member opposed to said end of said optical fiber.

5. The light emitting and receiving device according to claim 4, wherein said light emitting means, when mounted in said cavity, has an end surface thereof flush with said end surface of said light propagating member.

6. A light emitting and receiving device comprising:

an optical fiber;

a light propagating member for propagating light therethrough, which is provided with a light emitting means, said light emitting means converting first electrical signals into first optical signals; and a light receiving means which receives second optical signals and converts said second optical signals into second electrical signals, said light receiving means being disposed coaxially with said optical fiber, wherein said light propagating member is situated between an end of said optical fiber and said light receiving means, such that said light emitting means emits said first optical signals into said optical fiber at said end, and that said light propagating member receives from said optical fiber and propagates therethrough said second optical signal to said light receiving means, and wherein said light propagating member has a step portion formed at an end thereof opposed to said end of said optical fiber for mounting said light emitting means in an integrated manner with said light propagating member, said step portion extending in a width direction across said light propagating member.

7. An optical connector including a receptacle and an optical plug, said receptacle having a housing and a light emitting and receiving device received in said housing, said optical plug having a plug housing and an optical fiber received in said plug housing to be urged to said light emitting and receiving device when said receptacle and said optical plug are fitted together, said light emitting and receiving device comprising:

a light propagating member for propagating light therethrough, which is provided with a light emitting means located coaxially between said light propagating member and an end of said optical fiber, said light emitting means converting first electrical signals into first optical signals; and a light receiving means which receives second optical signals and converts said second optical signals into second electrical signals, said light receiving means being disposed coaxially with said optical fiber, wherein said light propagating member is situated between said end of said optical fiber and said light receiving means, such that said light emitting means emits said first optical signals into said optical fiber at said end, and that said light propagating member receives from said optical fiber and propagates therethrough said second optical signals to said light receiving means.

* * * * *